United States Patent [19]

Kiuchi et al.

[11] Patent Number: 4,877,622

[45] Date of Patent: Oct. 31, 1989

[54] PROCESS FOR PRODUCING FOOD MATERIAL

[75] Inventors: Hiroshi Kiuchi, Saitama; Katsumi Murata; Kazuo Murakami, both of Ibaraki; Isao Kusakabe, Chiba; Hideyuki Kobayashi, Ibaraki, all of Japan

[73] Assignees: Kabushikikiaisha Kibun; Kabushikikiaisha Kibun Foodchemifa, both of Tokyo, Japan

[21] Appl. No.: 298,287

[22] Filed: Jan. 13, 1989

Related U.S. Application Data

[63] Continuation of Ser. No. 32,462, Mar. 31, 1987, abandoned.

[30] Foreign Application Priority Data

Apr. 2, 1986 [JP] Japan .............................. 61-074170

[51] Int. Cl.⁴ .............................................. A23J 3/00
[52] U.S. Cl. ....................................... 426/46; 426/56; 426/656; 426/549; 426/557; 426/582; 426/583; 426/565; 426/580; 426/572; 426/602
[58] Field of Search ..................... 426/46, 49, 51, 52, 426/61, 63, 656, 598, 599, 634, 56, 549, 557, 582, 583, 565, 580, 572, 602

[56] References Cited

U.S. PATENT DOCUMENTS 3,852,480 12/1974 Williams ............................... 426/46
3,857,966 12/1974 Feldman et al. ..................... 426/46

FOREIGN PATENT DOCUMENTS 1012967 1/1976 Japan .................................... 426/46
0006844 1/1984 Japan .................................... 426/46

*Primary Examiner*—Marianne Cintins
*Attorney, Agent, or Firm*—Browdy & Neimark

[57] ABSTRACT

Protein obtained by coagulating soymilk with microbially produced protease within a pH range not causing acid coagulation and at a temperature higher than the optimum operation temperature of the protease provides food material of desirable flavor and high processability.

4 Claims, No Drawings

PROCESS FOR PRODUCING FOOD MATERIAL

This application is a continuation of application Ser. No. 032,462 filed Mar. 31, 1987 now abandoned.

FIELD OF THE INVENTION

This invention concerns a process for producing food material from soymilk.

More specifically, this invention relates to a process for producing food material of high processability.

BACKGROUND OF THE INVENTION

Soybean protein has generally been used more and more as protein material for ice creams, yoghurts, cheeses and dressings. It has aso been utilized for other foodstuffs, for example, pastes, daily dishes, cakes, breads, noodles and various kinds of dairy products, and soybean protein has become an extremely useful food material.

However, in the case of using soybean protein as food material, it has to provide favorable feeling upon eating and high processability.

As processes for producing soybean protein there have been various methods such as acid coagulation method, calcium coagulation method, enzyme method, heating method, alcohol coagulation method, etc. and food materials have been produced from bean proteins by respective methods.

However, those food materials obtained by the conventional method involve various problems such as acid taste, salty taste, bitter taste, gritty feeling due to intense coagulation, and poor processability. In addition, there is also a problem for the production process that the steps are complicated such as requirement for acid precipitation, neutralization and washing for isolated soybean protein or pre-heating treatment of soymilk in view of the protease of plant origin.

SUMMARY OF THE INVENTION

The present inventors have made an earnest study for obtaining coagulated milk-like protein food material having enriched flavor and smooth feeling upon eating and have succeeding in preparing coagulated protein products with no astringent taste, peculiar taste, bitterness or the like and having desirable curd flavor in an extremely convenient method by coagulating soymilk with microbially produced protease at a temperature higher than the optimum operation temperature of the protease.

This invention provides a process for producing food material, which comprises subjecting soymilk to a protease treatment within a pH range not causing acid coagulation and at a temperature higher than the optimum operation temperature.

DETAILED DESCRIPTION OF THE INVENTION

The temperature higher than the optimum operation temperature in this invention is, suitably, higher than 2° C., preferably, higher than 3° C. and, more preferably, higher than 4° C. of the optimum operation temperature.

As the starting material in this invention soymilk prepared from soybean, non-fat soybean, concentrated soybean protein and separated soybean protein can be used and, further, any of soymilk such as commercially available soymilk incorporated with sub-raw material such as oils may also be used. One example for the process of producing soymilk will be shown. Dried soybean was at first swollen with water, an aqueous 0.1% sodium hydrogen carbonate solution was then added after draining, the beans then were ground into a liquid which was filtered and the filtrate was taken as a soymilk containing about 4% protein.

Generally, since soybean protein coagulates within a pH range from 3.4 to 5.8 and intensely coagulates within a pH range for 4 to 5, it is required in this invention to exclude pH dependent coagulation. Preferably, pH is adjusted to higher than 5.9.

Further, since the soybean protein is coagulated with calcium to cause precipitation, in the case of adding calcium in this invention, calcium is present within such a range of concentration as causing no substantial calcium coagulation thereby accelerating protease coagulation.

The protein solution of soybean causes intense coagulative precipitation if the calcium concentration (as calcium salt) is higher than 20 mM. Although slight precipitation occurs also at a concentration of higher than 10 mM, since it does not lead to substantial coagulation, the concentration range causing no substantial calcium coagulation is, preferably, between 15 mM and 0.1 mM as the calcium salt.

Although the presence of calcium in soymilk is not an essential condition to this invention, since the amount of calcium varies slightly depending on the production method of soymilk and reduction temperature of protease, etc. it is necessary to determine such a concentration range as not causing no substantial calcium coagulation for each of the conditions.

In this invention, the soymilk is subjected to a protease treatment at a temperature higher than the optimum protease operation temperature.

The temperature higher than the optimum protease operation temperature is higher than by 2° C., preferably, 3° C., and, more preferably, 4° C., but if protease is added to soymilk, the coagulation start time tends to become earlier as the temperature is higher, as well as the condition of the resultant curd is also improved to cause less astringent taste, peculiar taste and bitterness.

The protease of microorganism origin may be any of alkaline protease (subtilis, Aspergillus, soya protease, etc.), neutral protease (thermolysin, pronase, etc.), acidic protease (Endothia, Mucur protease, etc.).

Protease may be added in any desired amount so long as it causes the protease coagulation, but it is sufficient to add, preferably, from 0.0002 to 0.2% of an enzyme preparation.

Since the optimum operation temperature is different depending on each protease, it is necessary to confirm each of the optimum operation temperatures and determine the milk coagulation temperature.

The coagulation reaction can be conducted by increasing the temperature for the soymilk to an appropriate temperature higher by 2°–30° C. than the optimum operation temperature for each of the proteases and adding each of them in an adequate amount. It may be or may not be agitated. The time required for the protein coagulation varies largely also depending on the kind of protease, but coagulation starts after several seconds to about 20 minutes when coagulated under stirring and the protein is completely coagulated by about 10–50 minutes. The coagulation is promoted under the presence of calcium.

The thus obtained coagulated protein can be separated through centrifugal separator, filter or the like and then dried by using various kinds of drying means.

The thus obtained protein drying products can, preferably, be gelled by merely swelling them again in water, which are suitable as food material.

The food material obtained according to the present invention may be used for ice creams, yoghurts, cheeses and dressings made from vegetable protein. It is also suitable as additives to paste-like products, daily dishes, cakes, breads and various kinds of dairy products, noodles, etc.

Test examples and examples according to this invention will be shown below. Test Example Soymilk (protein 4.0%, pH 6.1) was used each by 100 ml, and warmed to a reaction temperature (°C.) shown in Table 1 respectively. Each protease in Table 1 was added at an enzyme concentration (ppm) shown in Table 1. The coagulation start time was respectively detected by K. Arima, etc. (Agric. Biol. Chem, 31, 540, 1967) and the soymilk was left for 30 minutes after the starting of coagulation and filtered by using filter cloth in the midway to determine the condition and flavor of curds respectively thereby obtaining a result as shown in Table 1.

added to 1 kg of soymilk warmed to 60° C. (protein 4.0%, pH 6.1) to 200 ppm concentration in the soymilk, stirred slowly for 2 minutes, left then for 30 minutes and centrifuged (2700 rpm) to obtain a coagulated protein product of 80% water content.

EXAMPLE 2

An aqueous 10% calcium chloride solution was added to 1 kg of soymilk warmed to 65° C. (protein 4.2%, pH 7.14) to 0.02% concentration in the soymilk and, further, 0.01 % of an alkaline protease formulation (Alkalase 0.6L, manufactured by Nobo Industry Co.) followed by agitation. Then, they were left at 65° C. for 15 minutes and then centrifugated (2700 rpm) to obtain a coagulated protein product of 80% water content.

What is claimed is:

1. A process for producing food material, which comprises:
   reacting protein containing soymilk with a microbially-produced protease at a pH higher than 5.9 and at a temperature higher by at least 4° C. than the optimum temperature of the microbially-produced protease with respect to said reaction, for a reaction time of 10 to 50 minutes, the amount of protease reacted with said milk being sufficient to coagulate said milk protein at said pH and temperature within said reaction time;

TABLE 1

| Used enzyme | | | Reaction condition | | Test results | | |
|---|---|---|---|---|---|---|---|
| Name of enzyme | Manufacturer | Origin | Optimum temperature for protein decomposition (°C.) | Enzyme concentration (ppm) | Reaction temperature (°C.) | Coagulation start time (min) (sec) | Condition of curd | Flavor of curd |
| P-5380 | Sigma | Bacillus Subtilis | 60° C. | 20 | 60 | 1' 55" | good | astringent |
| | | | | | 65 | 1' 28" | " | good |
| | | | | | 70 | 1' 20" | " | " |
| Protine PC10F | Daiwa Kasei | " | 50~55 | 200 | 55 | 3' 49" | good | peculiar |
| | | | | | 60 | 2' 35" | " | good |
| | | | | | 65 | 1' 20" | " | " |
| Neutralase 0.5L | Nobo Industry | " | 45~55 | 200 | 60 | 3' 05" | good | good |
| | | | | | 65 | 2' 17" | " | " |
| | | | | | 70 | 2' 00" | " | " |
| Alkalase 0.6L | " | Batillus licheniformis | 60 | 200 | 60 | 7' 10" | slightly soft | good |
| | | | | | 65 | 3' 46" | good | " |
| | | | | | 70 | 3' 40" | " | " |
| Zeoplase sp4 | Nagase & Company, Ltd, | Bacillus Subtilis | 50~60 | 1000 | 60 | 3' 45" | good | bitter |
| | | | | | 65 | 3' 40" | " | " |
| | | | | | 70 | 2' 02" | " | good |
| P-5147 | Sigma | Streptomyces griseus | 50~60 | 20 | 55 | 9' 02" | slightly soft | good |
| | | | | | 60 | 6' 53" | good | " |
| | | | | | 65 | 5' 40" | " | " |
| Tasinase | Kyowa Hakko Kogyo C., Ltd. | Ray fungus | 50 | 500 | 50 | 4' 06" | good | slightly astringent |
| | | | | | 60 | 2' 33" | " | good |
| | | | | | 65 | 1' 48" | " | " |
| Protease [Amano] | Amano Seiyaku | Aspergillus oryzae | 50 | 500 | 55 | 1' 39" | good | slightly astringent |
| | | | | | 60 | 1' 33" | " | slightly bitter |
| | | | | | 65 | 1' 09" | " | good |
| Pantidase NP-2 | Yakult Honsha Co., Ltd. | " | 45~50 | 500 | 55 | 3' 53" | good | good |
| | | | | | 60 | 2' 02" | " | slightly bitter |
| | | | | | 65 | 2' 26" | " | good |
| Protease [Amano] | Amano Seiyaku | Aspergillus meleus | 45 | 500 | 55 | 1' 47" | good | slightly bitter |
| | | | | | 60 | 1' 27" | " | slightly astringent |
| | | | | | 65 | 50" | " | good |
| Fromase | Rapidase | Mucur michei | 55 | 2000 | 60 | 8' 15" | slightly soft | good |
| | | | | | 65 | 6' 50" | good | " |

EXAMPLE 11

A dissolved solution of a protease formulation (Protine PC10F : manufactured by Daiwa Kasei Co.) was separating the thus coagulated protein from the remainder of said milk; and incorporating the thus separated coagulated protein into a food product.

2. A process for producing food material as defined in claim 1, wherein the soymilk contains 0.1 to 15 mM of a calcium salt.

3. The process of claim 1, further comprising drying the coagulated protein after separation from the remainder of said milk and prior to its incorporation into said food product.

4. The process of claim 1, wherein said food product is dressing, paste, cake, bread, dairy product, noodles, vegatable-based ice-cream, vegatable-based yogurt or vegatable-based cheese.

* * * * *